Feb. 20, 1968  R. L. MOORE  3,369,785
CABLE RETAINING BRACKET
Filed Sept. 13, 1965

INVENTOR
ROBERT L. MOORE

BY *Julian E. Renfro*

ATTORNEY

United States Patent Office

3,369,785
Patented Feb. 20, 1968

3,369,785
CABLE RETAINING BRACKET
Robert L. Moore, Orlando, Fla., assignor to Martin-Marietta Corporation, Middle River, Md., a corporation of Maryland
Filed Sept. 13, 1965, Ser. No. 487,013
8 Claims. (Cl. 248—68)

ABSTRACT OF THE DISCLOSURE

A collapsible bracket apparatus for catching and retaining a cable, pipe, or the like, comprising a pair of posts, which are normally attached to a base, and an impact bar connected between the posts. Weakened points located in the bracket cause it to collapse in a predetermined manner when a cable, pipe, or the like is impacted against the impact bar so that the upper part of the posts close over and hold the cable, pipe, or the like, in the bracket.

---

During a missile launching the umbilical cable connected to the missile must be released in a manner to avoid rebounding into the flight path of the missile. An umbilical cable is of course a quickly detachable cable through which missiles are powered and controlled until the moment of launching. In the past umbilical cables have been designed to connect onto the missile at the bottom of the missile so that upon release the cable cannot get into the missile's flight path. While this method operates satisfactorily on some missiles, the wiring must extend to an upper part of the missile and this requires additional wires running along the side of the missile to the connecting plug for the umbilical cables, thus adding weight and taking up additional space within the missile. When the missile is not being launched from a silo, the cables are sometimes allowed to fall away from the missile of their own weight. It is also known to have a quick reaction lanyard connected to the umbilical cable to pull the cable away from the missile during launching, and this lanyard is generally spring biased, which often causes rebound into the missile's flight path.

The present invention deals with a retaining means to prevent the umbilical cable from rebounding into the missile once a lanyard has pulled the cable to the side of the launching silo, and to this end a plurality of collapsible brackets in accordance with the present invention are used to catch and hold the umbilical cable.

The collapsing brackets advantageously absorb some of the cable's energy while capturing and holding the cable to the wall. New brackets are required after each launching since the collapsed brackets are generally not reusable.

The collapsible bracket in accordance with this invention has a pair of posts, which are adapted to be fastened to a base and which are connected by an impact bar located between the posts and fastened thereto. The impact bar and posts advantageously have weak points, such as holes drilled in them, located so that when a cable strikes the impact bar it will collapse and cause the top portions of the posts to close over the cable, holding it in the collapsed bracket.

Mechanisms commonly used in the past for catching and retaining objects require hinged or pivot points and close tolerance latch releases, and consequently do not allow for catching a moving body which has several degrees of freedom at its point of impact. Accordingly, an object of the present invention is to provide a novel mechanism for catching and retaining an article, such as a cable, requiring no hinges or pivots, and whose point of impact is not controllable within close tolerances.

Figure 1:
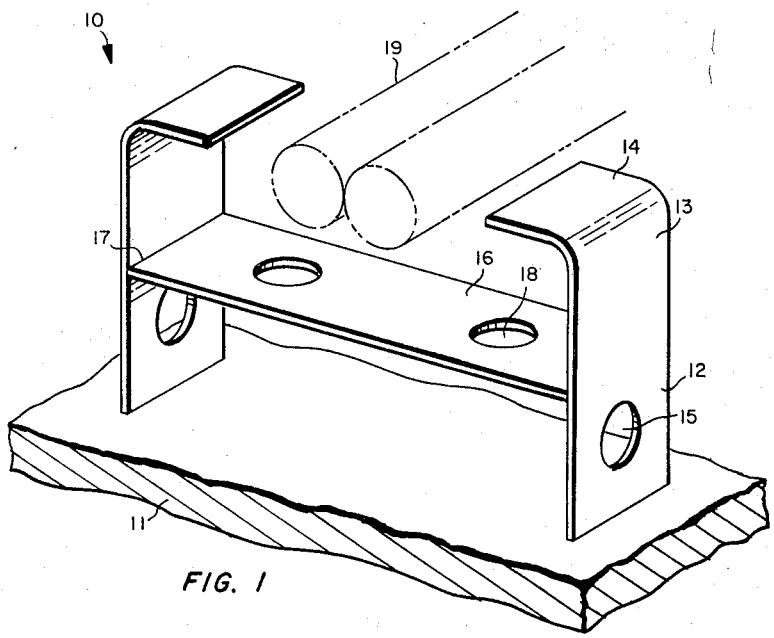
Figure 2:
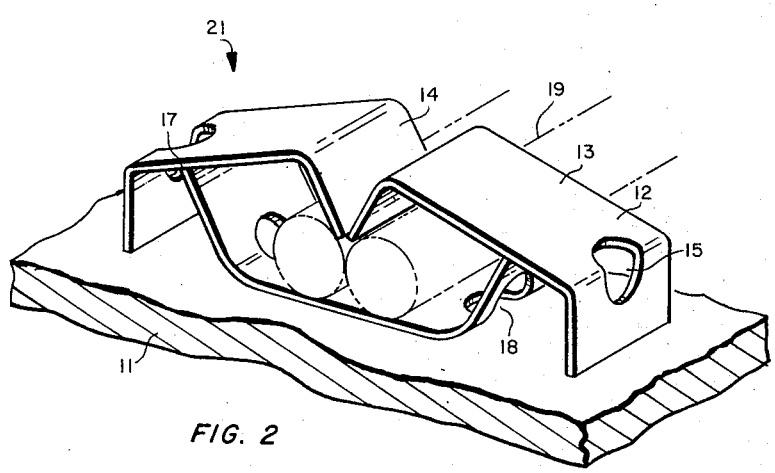

Other objects, features, and advantages of this invention will be apparent from a study of the written description and the drawings in which:

FIGURE 1 is a perspective view of the bracket of this invention prior to collapsing, and FIGURE 2 is a perspective view of the collapsed bracket.

In FIGURE 1 the cable retaining bracket is indicated at 10 secured to a base 11. The bracket has two posts 12, each with an upper section 13, which upper section may be shaped with a hook end 14. The posts 12 have weak points 15 weakened by holes in the posts. An impact bar 16 located between the posts 12 is connected to each post 12 at a location between the top and bottom of the posts indicated at 17 by any desirable fastening means such as welding, bolting or riveting. This bar 16 preferably has 2 weak points 18 located between its ends, also weakened by holes in the bar.

When an umbilical cable 19 collides with the impact bar 16, the bar will bend at the weak points 18 until a portion of the impact bar is stopped by the base 11. As the impact bar bends, it will pull the posts 12 inward towards the impact bar 16. The posts 12 will bend at the weak points 15 while the upper section 13 of the posts 12 will close over the umbilical cable 19 until the hooked ends 14 of the posts 12 contact the cable 19.

As can be seen the bracket 10 absorbs some of the energy of cable 19 upon impact and as the bracket collapses it captures and holds the cable firmly. Once the cable is caught in the bracket it will take a force many times greater than that necessary to collapse the bracket in order to free it. The cable attempts to rebound by pushing against the hooks 14, thereby placing a torque on the upper section 13 of posts 12 which desirably have no weak points thereon and may even be made of a stronger or reinforced material. While the brackets normally will be made entirely of one material, such as aluminum, with the weak points being created by removing material from the desired locations, the material used at the weak points 15 and 18 must be one that will allow yielding without fracture. A softer metal could be used at these weak points obviating the necessity of removing material from those points.

FIGURE 2 shows the bracket of FIGURE 1 in the collapsed state resulting from the unbilical cable 19 colliding with the impact bar 16. Bracket 21 is secured to base 11 and has posts 12 bent at weak points 15. Upper parts 13 of posts 12 have hooked arms 14 clamped onto the umbilical cable 19. Impact bar 16 connected at 17 to each post 12 is collapsed at its weak points 18. The umbilical cable 19 is shown locked in the bracket.

While the bracket is indicated as secured within the base, it could be secured to a base by any other desired means, such as by welding, bolting or riveting. The base could for instance be provided with lugs for bolting the bracket to the base. The bracket could then be easily replaced after it has been used, and can be manufactured in other suitable shapes. For instance the posts and impact bar could be of a generally cylindrical shape.

It should be noted that whereas members 12 and 13 are preferably one continuous piece of material, they could be separate pieces of material.

This invention is not to be construed as limited to the particular forms disclosed herein, since these are to be regarded as illustrative rather than restrictive.

I claim:
1. A collapsible cable-retaining bracket for capturing and holding an umbilical cable during a missile launching in order to prevent rebounds, comprising a pair of spaced posts adaptable to be secured to a base, connecting impact bar extending between said posts and attached thereto, said posts having upper portions disposed above the location of said impact bar, said impact bar having means whereby a cable striking the bar between said post will cause the bar to bend, each said post having at least one predetermined weak point thereon whereby the bending of said impact bar will cause said posts to bend at said predetermined weak points and close said upper portions thereof over the cable to capture and hold the cable.

2. A collapsible cable-retaining bracket for capturing and holding an umbilical cable during a missile launching in order to prevent rebounds, comprising a pair of spaced posts adaptable to be secured to a base, connecting impact bar means extending between said posts and attached thereto, said posts having upper portions disposed above the location of said impact bar means, said impact bar means having at least one predetermined weak point thereon whereby a cable striking the bar means between said posts will cause the bar means to bend at such predetermined weak points, each said post also having at least one predetermined weak point located thereon, whereby the bending of said impact bar means will cause said posts to bend at such weak points, and close the upper portions of said posts over the cable to capture and hold the cable.

3. The bracket according to claim 2 in which said upper portions of said posts are hook shaped.

4. The bracket according to claim 3 in which said posts and said impact bar means having predetermined holes therein creating said weak points thereon.

5. A collapsible cable-retaining bracket for capturing and holding an umbilical cable during a missile launching in order to prevent rebounds, comprising a pair of spaced posts adaptable to be secured to a base, connecting impact bar extending between said posts and secured thereto at a location approximately midway of the height of said posts, resulting in an upper portion of said posts disposed above the location of said impact bar, said impact bar having predetermined weak points thereon, whereby a cable striking the bar between said posts will cause the bar to bend at such predetermined weak points, said posts also having predetermined weak points located thereon, whereby the bending of said impact bar will cause said posts to bend at such weak points, and close the upper portions of said posts over the cable to capture and hold the cable.

6. The bracket according to claim 5 in which said impact bar has only one predetermined weak point.

7. A collapsible cable-retaining bracket for capturing and holding an umbilical cable during a missile launching in order to prevent rebounds, comprising a pair of spaced posts adaptable to be secured to a base, connecting impact bar extending between said posts and attached thereto, and a pair of retaining arms each extending above said impact bar, said impact bar having predetermined weak points thereon, whereby a cable striking the bar between said posts will cause the bar to bend at such predetermined weak points, said posts also having predetermined weak points located thereon, whereby the bending of said impact bar will cause said posts to bend at such weak points, and close the retaining arms over the cable to capture and hold the cable.

8. The bracket according to claim 7 in which said retaining arms are fastened to said impact bar.

References Cited
UNITED STATES PATENTS

| | | | |
|---|---|---|---|
| 2,523,185 | 9/1950 | Bedford | 248—74 X |
| 2,978,840 | 4/1961 | Totsch | 248—49 X |
| 3,080,140 | 3/1963 | Gohs et al. | 248—74 |

ROY D. FRAZIER, *Primary Examiner.*

J. F. FOSS, *Assistant Examiner.*